May 26, 1964  H. MOORE ETAL  3,134,115
METHOD OF MAKING SETSCREWS WITH UPSET THREAD CRESTS
Filed Jan. 24, 1962

INVENTORS
HARRINGTON MOORE
ALBERT G. ENGEL
BY Morse Altman

ATTORNEYS

United States Patent Office 3,134,115
Patented May 26, 1964

3,134,115
METHOD OF MAKING SETSCREWS WITH UPSET THREAD CRESTS
Harrington Moore, East Acton, and Albert G. Engel, Medford, Mass., assignors to George W. Moore, Inc., Waltham, Mass., a corporation of Massachusetts
Filed Jan. 24, 1962, Ser. No. 168,445
1 Claim. (Cl. 10—10)

This invention is a continuation-in-part of our co-pending application, Serial No. 141,447, filed September 28, 1961 and subsequently abandoned.

The invention relates to setscrews which are slightly multilated to prevent free rotation thereof in threaded holes when no pressure is on the screws. Small articles having setscrews assembled therein are sometimes sold as articles of commerce. For example, for certain purposes rings are made with radial holes in which setscrews are entered, ready to be turned by a tool to move radially inward when the ring is made to surround some object. When rings are shipped thus, it is important that none of the screws be shaken out and lost in transit. To prevent such loss, setscrews are slightly mutilated in a simple and economical manner to resist rotation in a threaded hole sufficiently to avoid working loose by vibration, but to permit ready rotation by a suitable tool.

As hereinafter described, the crest of a screw thread is upset by being peened over to one side to form a feather adapted to engage a flank of the internal thread in the hole into which the screw is introduced when being assembled with another object, the feather having a sufficient frictional binding action to prevent accidental rotation of the screw which might otherwise result from vibration of the assembly. Such mutilation is obtained by causing the screw to pass through a hole the diameter of which tapers to a magnitude slightly less than the major or crest diameter of the screw. This can be done either by pulling or by pushing the screw through the hole.

For a more complete understanding of the invention reference may be had to the following description thereof, and to the drawing, of which:

Figures 1, 2:
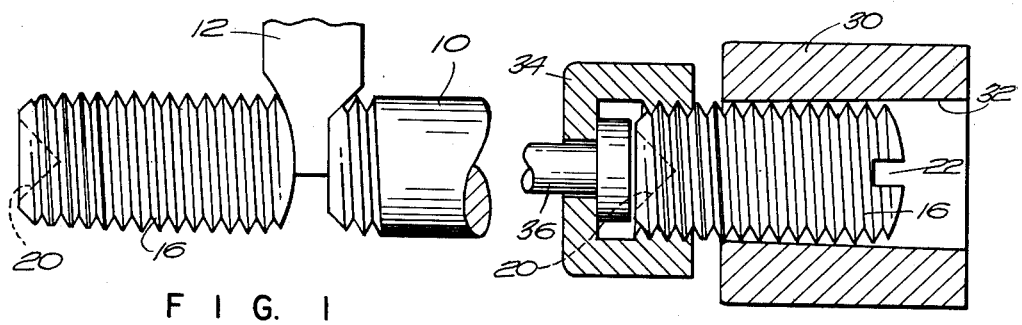
FIGURE 1 is an elevational view of a cut-off tool severing a setscrew from a length of rod stock.
FIGURE 2 is a fragmentary sectional view of a die and gripping means pulling a screw through the die.

Setscrews may be cut from rod stock 10 in the usual manner by a cut-off tool 12 which may be shaped, for example, as shown, to round off the driving end 14 of the screw 16 which is being severed from the rod 10 and also to cut a taper 18 on the new end of the rod 10 which taper will be on the work-engaging end of the next screw to be cut from the rod. For convenience, prior to cutting off the screw 16, enough of the rod is screw-threaded to provide a thread for the entire length of the screw 16, and a cup 20 may be formed in the end of the rod if that type of work-engaging end is desired for the screw 16. Either before or after the screw is cut from the rod, a plurality (preferably two or three) turns of thread at the work-engaging end of the screw are shaved to reduce the major or crest diameter of the screw at these turns, the shaving being done in such a way as to taper the major diameter of the screw adjacent to its work-engaging end. After the screw has been severed from the rod a slot 22 or other tool-receiving recess or shape may be made in or on the driving end of the screw.

In order to upset the crests of the thread turns, the screw is made to pass through a die block 30 which has a circular bore 32 with a fixed surface of tapering diameter slightly less at the exit end than the major or crest diameter of the screw. As indicated in FIGURE 2, a screw 16 is pushed, shaved end first, through the bore of the die 30 until the shaved end portion projects from the die. A special nut 34 is then screwed onto the projecting turns of thread. A pulling member 36 with a head 38 within the nut is attached to power operated means (not shown) to pull the remainder of the screw 16 through the die.

Figure 5:
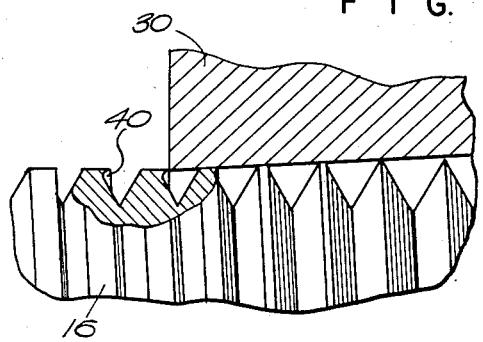
FIGURE 5 is an enlarged fragmentary view of the die shown in FIGURE 2, and a screw passing through it.

The effect of pulling the screw through the die is illustrated in FIGURE 5. The crests of the thread turns are upset by being peened over toward one flank of the thread, forming a feather 40 which projects from the normal contour of the thread. When the screw is inserted in a threaded hole of complemental size, the feather digs into a flank of the internal thread in the hole and thus provides frictional resistance to turning movement of the screw in the hole which is sufficient to prevent accidental turning of the screw by vibration, but not sufficient to prevent the turning of the screw by a suitable tool. Furthermore, when the screw is tightened in use so that the cupped end presses strongly against a workpiece, the reactive pressure on the screw forces the feather 40 to press strongly against the opposing flank of the internal thread in the hole in which the screw is located. Since the several turns of the internal thread will ordinarily be substantially uniform in shape as will also the upset configuration of the turns of the thread on the setscrew, except for the two or three shaved turns at the cupped end, the feathered turns of thread will have substantially uniform holding power to lock the screw against reverse rotation in the hole, and each turn will have substantially uniform holding power throughout its convolution or length around the screw.

Figure 3:
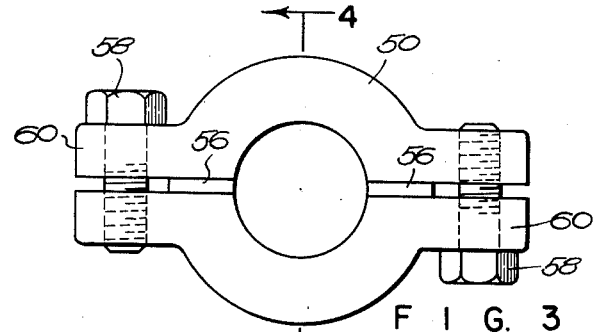
FIGURE 3 is an end view of a die through which screws are to be passed.
Figure 4:
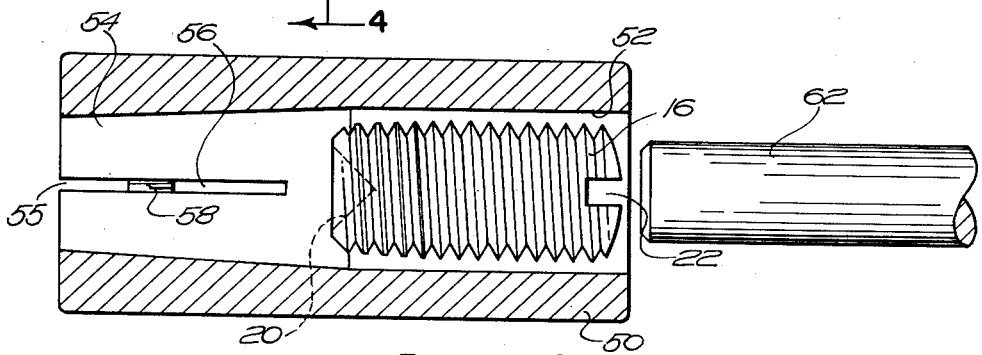
FIGURE 4 is a section on the line 4—4 of FIGURE 3 together with a screw therein and a pusher.

Instead of pulling the screw through a die, it may be pushed through as illustrated in FIGURE 4. In either event, relative axial movement of the screw and die is required, regardless of whether the screw is moved through a stationary die, a die is moved on a stationary screw, or both screw and die are moved in opposite directions. The die 50 shown in FIGURES 3 and 4 has a bore 52 which tapers as at 54 to an exit diameter less than the crest diameter of the screw. The exit end portion of this die is split by two slots 56 so that the exit diameter can be adjusted to some extent by means of bolts 58 which pass through ears 60 at the exit end of the die. A power-operated pusher or plunger 62 is employed to push a screw 16 through the constricted exit of the die. This results in the upsetting of the crests of the turns of the screw thread except for the two small portions of each turn which register with the slots 56. These small undisturbed portions of the thread make possible the use of certain kinds of gauges to test the threads of finished screws, if desired.

The screw shown in FIGURE 4 of the drawing is about to be pushed through the die cupped end first. If preferred, the screw can be introduced with its other end first so that the crests will be upset toward the work-engaging end instead of toward the driving end.

We claim:

The method of modifying the thread turns of a setscrew, which comprises shaving the crests from a plurality of turns of thread at one end of the screw, pushing the shaved end portion of the screw through a die block having a circular bore with a fixed surface tapering to a diameter slightly less than the crest diameter of the screw until said end portion projects beyond the die, gripping said projecting end portion, and pulling the rest of the screw through the die.

References Cited in the file of this patent

UNITED STATES PATENTS

| | | |
|---|---|---|
| 1,250,748 | Woodward | Dec. 18, 1917 |
| 2,056,053 | Moore | Sept. 29, 1936 |
| 2,135,637 | Gade | Nov. 8, 1938 |
| 2,348,591 | Bailey | May 9, 1944 |
| 2,787,796 | Rosan | Apr. 9, 1957 |
| 2,855,609 | Moore | Oct. 14, 1958 |
| 3,076,208 | Moore | Feb. 5, 1963 |